US006850925B2

(12) United States Patent
Chaudhuri et al.

(10) Patent No.: US 6,850,925 B2
(45) Date of Patent: Feb. 1, 2005

(54) QUERY OPTIMIZATION BY SUB-PLAN MEMOIZATION

(75) Inventors: Surajit Chaudhuri, Redmond, WA (US); Ashraf I. Aboulnaga, Madison, WI (US)

(73) Assignee: Microsoft Corporation, Redmond, WA (US)

(*) Notice: Subject to any disclaimer, the term of this patent is extended or adjusted under 35 U.S.C. 154(b) by 618 days.

(21) Appl. No.: 09/858,206

(22) Filed: May 15, 2001

(65) Prior Publication Data

US 2003/0055813 A1 Mar. 20, 2003

(51) Int. Cl.[7] .............................. G06F 17/30; G06F 7/00
(52) U.S. Cl. ........................................... 707/2; 707/100
(58) Field of Search ................................ 707/2, 100

(56) References Cited

U.S. PATENT DOCUMENTS

| | | | | |
|---|---|---|---|---|
| 5,301,317 A | * | 4/1994 | Lohman et al. | 707/2 |
| 5,600,831 A | * | 2/1997 | Levy et al. | 707/2 |
| 5,930,785 A | * | 7/1999 | Lohman et al. | 707/2 |
| 6,021,405 A | * | 2/2000 | Celis et al. | 707/2 |
| 6,275,818 B1 | * | 8/2001 | Subramanian et al. | 707/2 |
| 6,330,552 B1 | * | 12/2001 | Farrar et al. | 705/400 |
| 6,353,818 B1 | * | 3/2002 | Carino, Jr. | 707/2 |
| 6,438,741 B1 | * | 8/2002 | Al-omari et al. | 707/2 |

OTHER PUBLICATIONS

Robert Philip Kooi, Booklet "The Optimization of Queries in Relational Databases", Case Western Reserve University, 1980.

V. Poosala and Y. Ioannids, "Selectivity Estimation Without the Attribute Value Independence Assumption", Proceedings of the 23rd VLDB Conference, Athens, Greece, 1997.

* cited by examiner

*Primary Examiner*—Greta Robinson
*Assistant Examiner*—Susan Rayyan
(74) *Attorney, Agent, or Firm*—Microsoft Corporation

(57) ABSTRACT

Database system query optimizers use several techniques such as histograms and sampling to estimate the result sizes of operators and sub-plans (operator trees) and the number of distinct values in their outputs. Instead of estimates, the invention uses the exact actual values of the result sizes and the number of distinct values in the outputs of sub-plans encountered by the optimizer. This is achieved by optimizing the query in phases. In each phase, newly encountered sub-plans are recorded for which result size and/or distinct value estimates are required. These sub-plans are executed at the end of the phase to determine their actual result sizes and the actual number of distinct values in their outputs. In subsequent phases, the optimizer uses these actual values when it encounters the same sub-plan again.

26 Claims, 3 Drawing Sheets

US 6,850,925 B2

QUERY OPTIMIZATION BY SUB-PLAN MEMOIZATION

FIELD OF THE INVENTION

The present invention concerns a query optimizer for use with a database management system. Such an optimizer divides the process of answering a query posed to the database management system into a sequence of sub-steps or sub-plans for efficiently answering the query.

BACKGROUND ART

In database systems, a query optimizer determines the execution plans of queries. For any given query, the query optimizer chooses the plan with the lowest estimated cost. To estimate the cost of a plan, the optimizer uses knowledge of the result sizes of the operators comprising the plan. The optimizer also uses knowledge of the number of distinct values in the output of these operators. More accurate knowledge of these two quantities results in more accurate cost estimates, and hence a better choice of query execution plan.

The result size of an operator and the number of distinct values in its output depend on the data distribution of the query. To estimate these two quantities, database systems use various techniques to approximate input data distributions, such as histograms or sampling. The estimated values provided by these techniques, no matter how accurate, are only approximations that invariably deviate from the true values to some extent. Since query optimizer cost models are highly sensitive to result size and distinct value estimates, the errors in estimating these quantities lead to errors in estimating plan costs. Estimation errors increase as they propagate through the large query execution plans. For table joins, which are used in almost all database queries, the estimation error can be exponential in the number of joins. These errors can ultimately cause the optimizer to choose a sub-optimal plan. However, the plans chosen using these techniques, while not necessarily optimal, are usually "good enough." These techniques are used because they quickly provide the required estimates. Query optimization, including all the necessary estimation steps, must not take more than a very small fraction of the time to execute the query. Query optimizers therefore use these fast but possibly inaccurate estimation techniques since the performance of the chosen plans is typically acceptable for many applications.

This reasoning assumes that the database system mostly handles ad hoc queries—queries for which optimization must be fast and for which sub-optimal plans are acceptable. This is not true for queries embedded in applications, which comprise a large portion of the workloads handled by modern database systems. These queries can be (and often are) optimized off-line to produce a compiled version of the query that is then used whenever the query is executed. Such optimizations do not necessarily have to be fast since they are off-line processes. Furthermore, these queries are typically executed frequently since they are part of the application. Thus, the cost of optimization is amortized over many executions of the query. Moreover, finding the optimal execution plan in this setting is more important than for ad hoc queries, because the repeated execution of the queries will increase the effect of any savings in execution time. For these embedded queries, the user may be willing to spend more time optimizing the query and obtaining more accurate cost estimates if this results in choosing a faster execution plan.

Several techniques for estimating result sizes have been proposed in the literature. All these techniques deal with estimating the result size of a single selection or join operator. Some of these techniques can also be extended to estimating the number of distinct values in the output of these operators.

One technique for estimating result sizes is to sample the data at query optimization time. One disadvantage of this approach is the overhead it adds to query optimization. Furthermore, sampling cannot be used to accurately estimate the number of distinct values of an attribute. Sampling is more useful for other applications such as building histograms or approximate query processing.

A second technique for estimating result sizes is using histograms. Histograms are now used by most commercial database systems for result size estimation. Although one-dimensional equi-depth histograms are used in most systems, more accurate histograms have been proposed for use with single and multiple dimensions. A novel approach for building histograms based on wavelets is presented in a paper by Y. Matias, J. S. Vitter, and M. Wang entitled "Wavelet-based Histograms for Selectivity Estimation" in *Proceedings of the ACM SIGMOD Conference*, pages 448–459, 1998. Histograms, by their very nature, only capture an approximation of the data distribution, and incur varying degrees of estimation errors.

A third technique for estimating result sizes is using feedback from the query execution engine. This approach eliminates the overhead of histogram construction and maintenance, so it is potentially less expensive than traditional histograms. However, it is still an approximate technique with significant estimation errors.

The importance of estimating the result size of joins is discussed in the literature as early as 1986. See L. F. Mackert and G. M. Lohman, "R* Optimizer Validation and Performance Evaluation for Local Queries" in *Proceedings of the ACM SIGMOD Conference*, pages 84–95, 1986. In this paper, it is noted that the cost model used by the R* System query optimizer for nested loop joins is very sensitive to the estimated result size of the join. Inaccurate result size estimation can lead to sub-optimal plans being chosen. This conclusion demonstrates the usefulness of our approach.

SUMMARY OF THE INVENTION

The present invention aims at providing accurate values for the result sizes and the number of distinct values in the outputs of sub-plans encountered by the query optimizer during optimization. A sub-plan is an operator tree consisting of one or more operators. Instead of estimating the result sizes and the number of distinct values in the outputs of sub-plans, in accordance with the invention, the sub-plans are actually executed and these two quantities are exactly determined.

An exemplary process for optimizing a query to produce a query execution plan in accordance with the invention is aimed at a specific database. The invention includes a sub-plan memo data structure for storing data concerning multiple sub-plans that form parts of potential query execution plans. An input query is optimized to produce a first set of sub-plans that are parts of potential query execution plans for the input query. When each of these sub-plans is executed, it produces a result record set from the database. A sub-plan query statement is formed for each of the sub-plans that make up the first set of query execution sub-plans. Each of the sub-plan query statements is executed on the database and the size of the result set produced by said execution and the number of distinct values contained in this result set are stored in the sub-plan memo data structure. These two quantities obtained from the sub-plan executions are exact quantities, and they are then used by a query optimizer to produce a final query execution plan for answering the input query. Since the optimizer bases the final query execution plan on exact quantities rather than estimates, the produced execution plan is very efficient.

Since query optimization performed in accordance with the invention causes multiple sub-plans to be executed, optimization will take a longer time to complete. It will usually take much longer than the execution time of the query being optimized. However, the optimizer cost models use 100% accurate result size and distinct value estimates for the different sub-plans. This results in more accurate optimizer cost estimates, which leads to a better choice of query execution plan. The design fits well into the query optimizers of current relational database systems, requires few modifications to the optimizer code, and can easily be turned on or off.

The exemplary query optimization proceeds in phases. In a first phase, as the optimizer searches the space of possible plans, it records in the sub-plan memo data structure all sub-plans for which result size and distinct value estimates are required. At the end of the phase, the recorded sub-plans are executed and their result sizes and the number of distinct values in their outputs are determined and recorded in the sub-plan memo. In subsequent phases, the optimizer repeats its search of the plan space. Most of the sub-plans encountered in this search will be ones that were already encountered in previous phases, so the actual values of their result sizes and the number of distinct values in their outputs are known and available in the sub-plan memo, and the optimizer uses these exact values.

Since the optimizer is using more accurate result size and distinct value estimates, it may search parts of the plan space not searched before and encounter new sub-plans. If the optimizer encounters a sub-plan for which the actual values of the result size and the number of distinct output values are not known, this sub-plan is recorded in the sub-plan memo. At the end of the phase during which one or more new sub-plans are encountered, all these newly recorded sub-plans are executed to determine the required quantities. The process is repeated until the optimizer goes through a phase in which it does not encounter any new sub-plans. The final query execution plan is chosen during this last phase.

Other features of the invention will become better understood from the following detailed description of an exemplary embodiment of the invention which is described in conjunction with the accompanying drawings

EXEMPLARY EMBODIMENT FOR PRACTICING THE INVENTION

Figure 2:
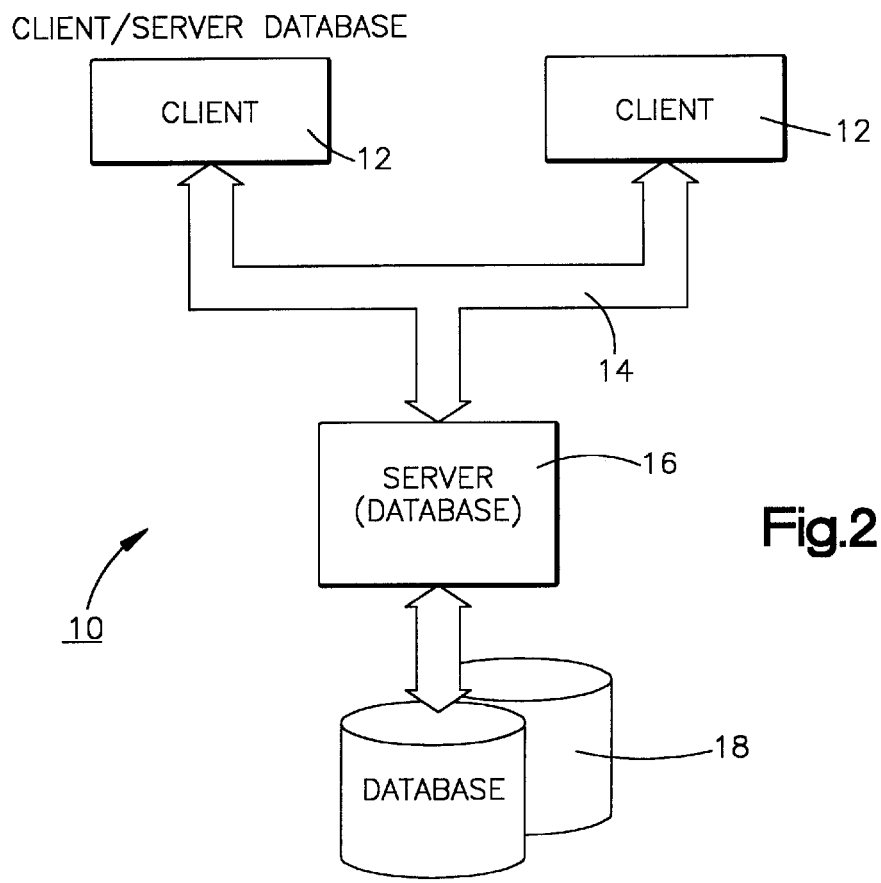
FIG. 2 is a schematic depiction of a client/server database system.

FIG. 2 illustrates an example of a suitable client/server database system 10 for use with an exemplary embodiment of the invention. The system 10 is only one example of a suitable operating environment for practice of the invention. The system includes a number of client computing devices 12 coupled by means of a network 14 to a server computer 16. The server 16 in turn is coupled to a database 18 which is maintained on a possible large number of distributed storage devices for storing data records. The data records are maintained in tables which contain multiple number of records having multiple attributes or fields. Relations between tables are maintained by a database management system (DBMS) that executes on the server computer 16. The database management system is responsible for adding deleting and updating records in the database tables and also is responsible for maintaining the relational integrity of the data. Furthermore, the database management system can execute queries and send snapshots of data resulting from those queries to a client computer 12 that has need of a subset of data from the database 18.

Figure 3:
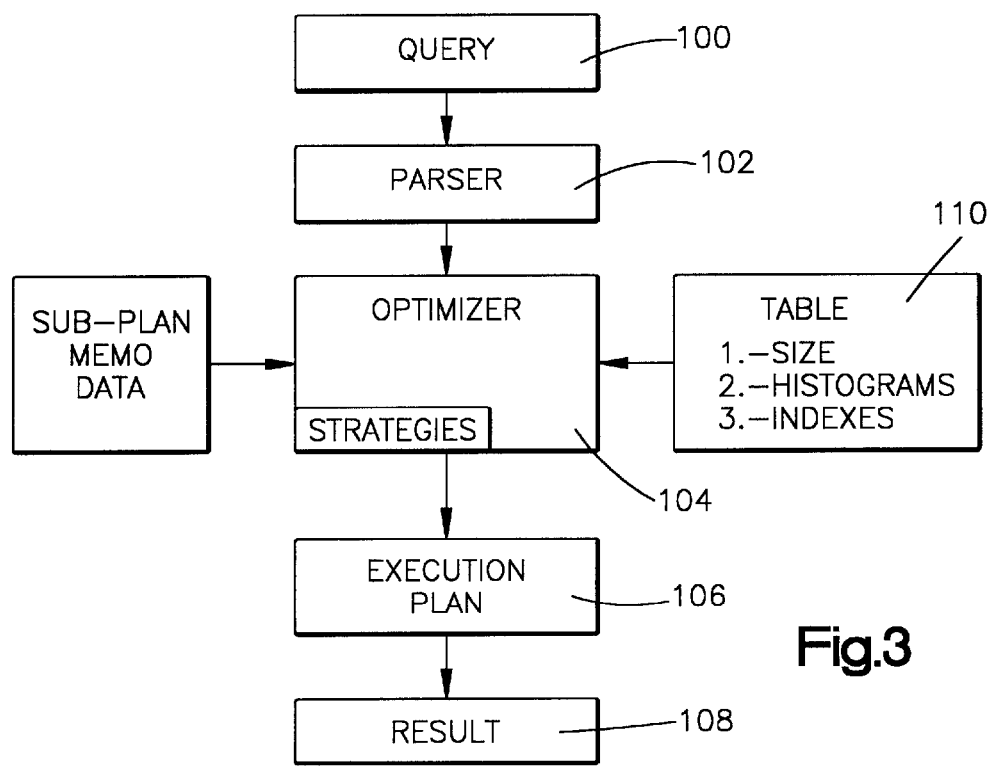
FIG. 3 is a flowchart showing a query execution process performed by a database management system.

FIG. 3 schematically illustrates query optimization by a database management system (DBMS). A query 100 is posed by a client computer 12, for example, to the server computer 16 running database management software. The query 100 is initially parsed by a parser 102 which examines the syntax of the query to assure that it is properly formatted. The query then passes to an optimizer 104 which performs a task of finding a best query execution plan for implementing the query. An execution plan 106 is formulated that best answers the query 100 in accordance with different options known to the optimizer. These options are characterized as strategies in the FIG. 3 depiction of the query evaluation scheme. The execution plan is then executed over the database 18 to produce a result 108 or data subset. This result data set is made up of data from a number of tables in the database 18 that have been joined together in as efficient manner as possible during execution of the query execution plan 106 created by the query optimizer 104.

Existing optimizers make use of a so called meta-table 110 (also referred to as a system table or a catalog) which maintains data concerning the various tables that make up the database 18. This table 110 contains the number of records or tuples in the various data tables as well as a listing of columns in the database on which indexes have been constructed. Additionally the meta-table 110 often contains a histogram of the data for certain columns in the database. As a simple example, assume the database has three tables R,S,T. The meta-table can contain histograms for certain attributes or columns, such as R.A, R.B, S.C and T.A. Furthermore the table can contain a catalog of indexes so that for example R.A may be indexed as is attribute T.B. Knowledge of this information as well as a knowledge of the different strategies available for answering a query can lead to an execution plan that takes advantage of the data contained in the meta-table.

A mistake in query optimization may be unimportant if the query is over a rather small database having only a few tables with a relatively small number of records per table. However, as the size of the database increases and the complexity of the query increases, the query execution time can increase dramatically so that a query execution can take hours on a large database. This is particularly inefficient and therefore costly if the query is executed frequently. For queries that are frequently executed, it is important that the optimizer choose a 'good' execution plan, i.e. the most efficient plan that will return results in the form of a set of tuples that form a view of a dataset as quickly as possible.

Existing query optimizers address the task of query optimization by breaking up a query into a set of sub-tasks that when executed combine to produce the desired query output. Stated another way, the execution plan 106 is made up of a series of sub-plans that together form a dataflow diagram for producing a data set output. An output from a sub-plan can produce a data stream which is routed to another sub-plan which produces an additional part of the dataflow leading to the query result.

Figure 4:
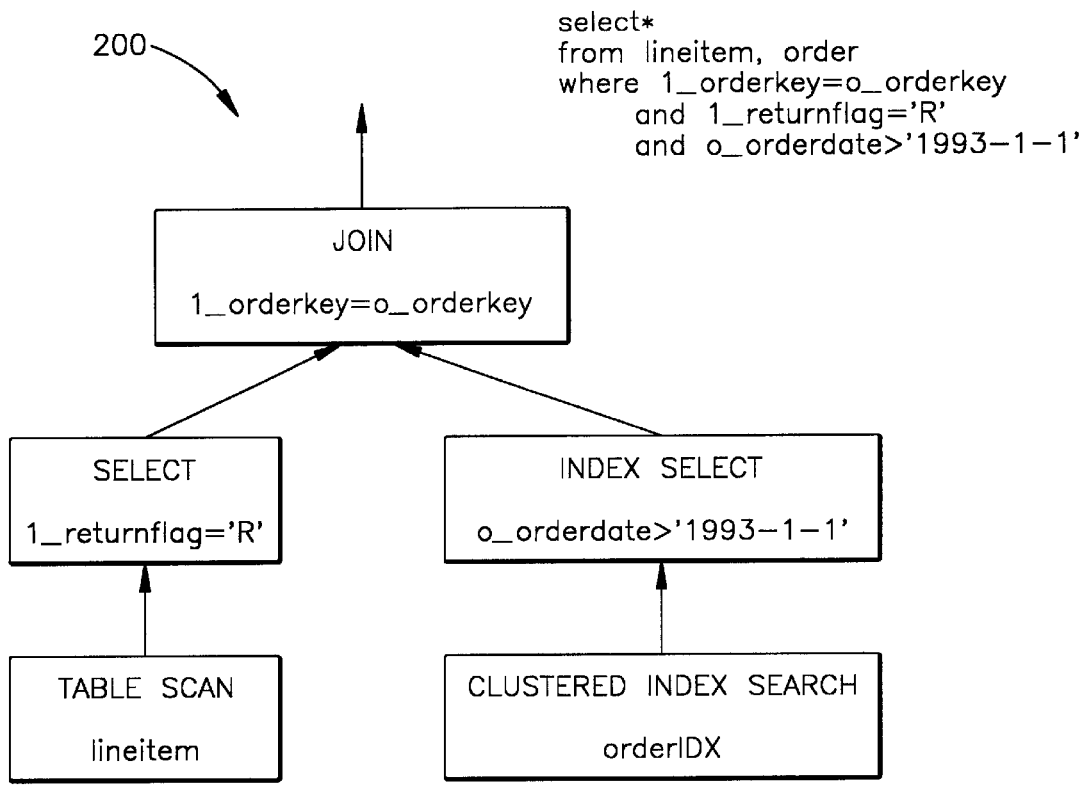
FIG. 4 is a representation of a query execution plan.

FIG. 4 is a graphical depiction of an illustrative sub-plan 200 which could be chosen as a portion of an entire execution plan by an optimizer. This sub-plan evaluates data from two database tables, 'lineitem' and 'order'. A 'leaf' portion of the sub-plan corresponds to these two tables. Accessing data from the two tables is dependent on the information in the meta-table available to the optimizer. The 'lineitem' table data must be scanned sequentially and the index on the 'order' table allows an indexed access of data. The sub-plan 200 depicted in FIG. 4 is equivalent to the SQL statement "select * from lineitem, order where 1_orderkey= o_orderkey and 1_returnflag='R' and o_orderdate>'1993-1-1'". In this statement an '1' prefix denotes an attribute from the 'lineitem' table and an 'o' prefix denotes an attribute from the 'order' table. A complex query involving many attributes and many tables would typically be made up of many such sub-plans that route data from one sub-plan to a next until a query result is obtained. For a given query 100 sent to the optimizer, different sub-plans are used depending on the contents of the meta-table. Note, however, that the contents of the meta-table may produce inefficient query execution plans based on either inadequate statistics or choice of a wrong implementation strategy based on the available statistics.

The exemplary embodiment of the present invention performs query optimization by recording sub-plans, and also their result sizes and the number of distinct values in their outputs. This information is stored in a hash table (FIG. 5) referred to in the present disclosure as a sub-plan memo 210. To record a sub-plan in the sub-plan memo, an SQL statement that is logically equivalent to this sub-plan is constructed (i.e., the SQL statement produces the same set of tuples as the sub-plan). The SQL statement is then hashed (as a character string) and it is recorded in the sub-plan memo. When the result size and the number of distinct values in the output of an SQL statement are determined, they are also recorded in the sub-plan memo.

Figure 5:
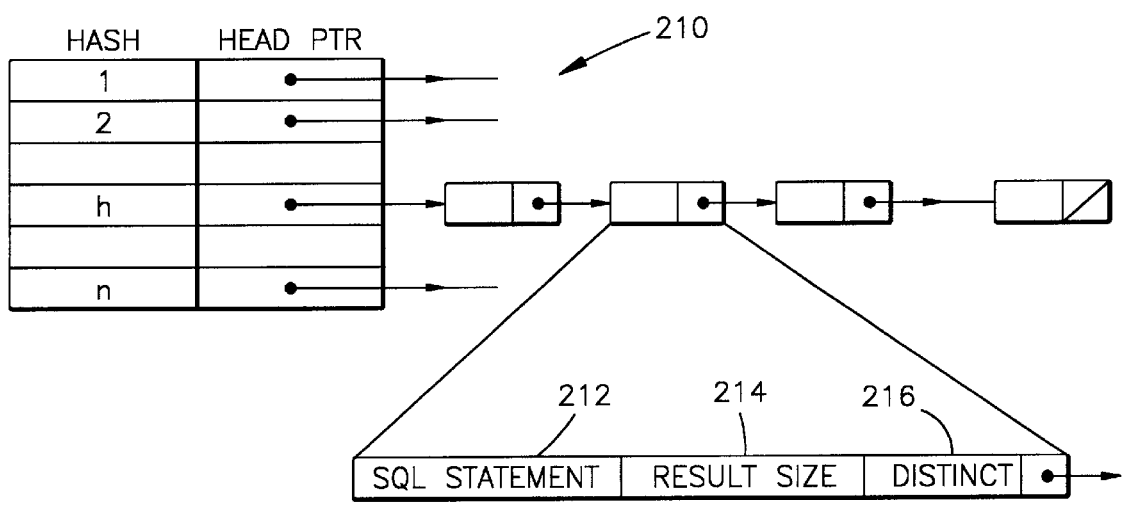
FIG. 5 is a data structure showing data stored by a query optimizer relating to query execution sub-plans encountered during optimization of a query.

FIG. 5 illustrates the structure of the sub-plan memo 210. It is a hash table in which each entry has three fields: a character string 212 representing an SQL statement (the hash key), a result size 214 of this statement for the database 18, and a number of distinct values 216 in the output of this statement. The result size is the number of tuples or records the query returns.

The number of distinct values refers to the number of distinct rows in the return set of data resulting from execution of the query. Stated another way, the number of distinct values is the number of distinct combinations of column values that are present in the rows of the result set of the query. The result set of a query consists of records or rows that have attributes or columns. The result set may contain duplicate rows in which the values in each column are the same for all rows. Every group of duplicate rows contributes one distinct value to the tally of distinct values. Every row for which there are no duplicate rows in the result set also contributes one distinct value to the tally of distinct values. One instance of a circumstance where the number of distinct values is important for query optimization is in optimizing SQL 'GROUP BY' queries.

The sub-plan memo data structure 210 is local to the query optimizer, and is used for optimizing one query. An initially empty sub-plan memo data structure 210 is created at the start of optimizing a query, and this sub-plan memo is used until optimization is complete. When an entry for an SQL statement is created in the sub-plan memo, the result size and distinct values fields are initially set to −1, indicating that they are invalid. These fields are updated when the actual values of the number of data records or result size and the number of distinct data record values in the output of the SQL statement are determined.

An exemplary process of query optimization by sub-plan memoization is contained in listing 1. Practice of the invention proceeds in multiple phases. A phase is a fall optimization of the query starting with the SQL statement (or, equivalently, with the initial logical tree representing the SQL statement) and producing a query execution plan. In each phase, whenever the optimizer encounters a sub-plan for which it requires result size and/or distinct value estimates, it constructs an SQL statement that is logically equivalent to this sub-plan and looks it up in the sub-plan memo. If an entry for the statement is found, and the result size and distinct values fields 214, 216 are valid, the optimizer uses the values in these fields. If no entry is found, the optimizer adds a new entry to the sub-plan memo 210, and stores the constructed SQL statement in the SQL statement field 212 of this new entry. If no entry for the constructed SQL statement is found in the sub-plan memo, or if an entry is found but its result size and distinct value fields are invalid, the query optimizer uses histograms or any other traditional estimation technique to estimate the required quantities.

At the end of each phase, after the search of the plan space is completed and the final execution plan is chosen, the process scans the sub-plan memo structure 210 to find entries that were added in this most recent phase. These are the entries whose result size and distinct values fields are invalid (i.e., −1). The process then executes the SQL statements having invalid result size and distinct value fields. Based on the execution of these statements, the actual result sizes and the actual number of distinct values in their outputs are determined. These values are recorded for each newly added SQL statement in its sub-plan memo entry. The SQL statements in the sub-plan memo are processed independently of the query being optimized by sub-plan memoization. They are complete stand-alone queries that are evaluated as any query in the system. These queries must be optimized without using sub-plan memoization, as they are ad hoc queries for which traditional estimation techniques such as histograms work best. More importantly, using sub-plan memoization for these queries would lead to an infinite recursion, since they themselves will have sub-plan memos and will generate more SQL statements to execute.

After determining the result sizes of the newly added sub-plans and the number of distinct values in their outputs, a new optimization phase begins. Since the query optimizer uses a deterministic algorithm to search the plan space, many sub-plans encountered in the new phase will already be in the sub-plan memo from earlier phases, so the exact values of their result sizes and the number of distinct values in their outputs will be known. However, since the new phase uses more accurate result size and distinct value information than earlier phases, the optimizer may explore different parts of the plan space and generate sub-plans not used in earlier optimization phases and therefore not in the sub-plan memo 210. The cycle of optimization continues and new sub-plan execution takes place until either (a) the optimizer goes through a phase in which all encountered sub-plans have previously been executed, or (b) the number of optimization phases exceeds k, an upper bound on the allowed number of phases. An exemplary embodiment of the invention uses k=5. The query execution plan returned by the optimizer is the plan chosen by the last optimization phase.

Listing 1 describes a process of query optimization by sub-plan memoization in C-like pseudo-code.

---
Listing 1

```
ExecutionPlan OptimizeBySub-planMemo (Query q)
    /* Input: Query to optimize by sub-plan memoization.
       Returns: Execution plan for q */
{
        Create an empty
        sub-plan memo, spm;
        numphases =0;              /* Counter for the number of
        do {                        optimization phases. */
            numphases++;
            newsub-plans = false;   /* Are new sub-plans encountered
            execplan = Optimize     during this phase? */
            (q, spm, newsub-plans);
            if (newsub-plans){
                Iterate through spm executing new SQL statements
                to get result sizes and distinct values;
            }
        }while (newsub-plans && numphases <= k);
        return execplan;
}
```
---

The input to the process of listing 1 is a query expressed in the form used by the optimizer for initial queries. For example, it could be the SQL character string or an initial logical tree. The function Optimize, called in listing 1, is an invocation of the query optimizer to optimize q. The optimizer is modified to use the sub-plan memo, spm, for estimation as outlined above, and to set the flag newsub-plans to true if it adds any new entries to the sub-plan memo. These modifications to the optimizer only require changing the result size and distinct value estimation routines. Listing 2 presents the modified result size estimation algorithm. The distinct value estimation algorithm is very similar. No further changes to existing optimizers are required for implementing sub-plan memoization.

---
Listing 2

```
int ResultSizeEstimate (Sub-plan s, Sub-planMemo &spm,
bool &newsub-plans)
/* Input: Sub-plan whose result size is required, and
sub-plan memo to use for estimation.
    Returns: Result size estimate. newsub-plans is
    set to true if entries are added to spm. */
{
    sql = SQL statement corresponding to s;
    e = spm entry corresponding to sql; /* Lookup SQL statement in
                                            hash table. */
    if (An entry e is found){
        if (e. result_size>=0){      /* If entry e is valid, use it. */
            return e.result_size;
        }
    }else {                          /* This is the first time to
                                        encounter sql. Add it to spm. */
        Add a new entry for sql to spm;
        newsub-plans = true;         /* Will need to get the result
                                        size of this SQL statement. */
    }
    res_size = Estimated result size of s using traditional
    estimation techniques; return res_size;
}
```
---

The disclosed sub-plan memoization procedure operates by generating an SQL statement that is logically equivalent to any sub-plan for which result size or distinct value estimates are required (i.e., a statement that produces the same set of tuples as this sub-plan). The SQL statement serves two purposes. It is executed to determine the actual result size of the sub-plan and the number of distinct values in its output. The SQL statement is also used to identify the sub-plan in later optimization phases, so that these actual values can be used by the optimizer. Generating an SQL statement for the sub-plan memo 210 from a sub-plan is a fairly simple task, since all possible operators that can appear in a sub-plan have directly corresponding SQL constructs. As such, generating the SQL statement simply involves traversing the sub-plan tree and creating the required SQL constructs. Creating these constructs may require consulting the catalog to determine attribute and table names. FIG. 4 shows an example of a sub-plan and the corresponding SQL statement.

The generated SQL statements need not be the "most compact" or "most efficient" SQL. Processing these statements does not affect the performance of the database system in production mode, since it is done only once as part of the off-line process of optimizing embedded queries. The process allows generating different SQL statements for sub-plans that are logically equivalent but are not identical (e.g., the outer and inner relations in a join are reversed). Not recognizing that these sub-plans are equivalent for the purpose of result size and distinct value estimation does not affect the quality of the optimizer decisions. It only means that the optimizer does more work, since it adds logically equivalent SQL statements to the sub-plan memo, and these statements are independently executed giving identical results. What is required is that the exact same SQL statement be generated for a sub-plan each time it is encountered during optimization. This allows the process to identify sub-plans in later optimization phases that were already encountered in earlier phases, a necessary condition for convergence.

The sub-plans in the sub-plan memo 210 can be simple, such as single selections on base tables, or they can be complex, such as multiple selections and joins with aggregation. This is a significant improvement over traditional estimation techniques such as histograms or sampling. Traditional estimation techniques work for single selections, and some of them work for joins. Estimation for complex sub-plans involving multiple operators using prior art techniques involves approximation and many simplifying assumptions, leading to estimates that are sometimes no better than guesses. On the other hand, sub-plan memoization gives estimates that are accurate for all sub-plans, regardless of complexity.

Sub-plan memoization is not meant to replace traditional estimation techniques such as histograms. Because of its long running time, sub-plan memoization is only suitable for embedded queries that are optimized once and executed frequently. Traditional estimation techniques are more suitable for ad hoc queries or queries that are not executed very frequently. Furthermore, traditional estimation techniques are used by the present invention (a) when the sub-plan is not found in the sub-plan memo, and (b) when optimizing the SQL statements representing identified sub-plans to execute them and get their result sizes and the number of distinct values in their outputs.

The quality of the traditional estimation techniques used in query optimization by sub-plan memoization affects the speed of convergence of the technique. Having high quality estimates to begin with leads the optimizer to explore the correct part of the plan space even in the first optimization phase. The increased estimation accuracy in the second phase and beyond will not cause the optimizer to generate too many new sub-plans, since it was in the right part of the space to begin with. This leads to fewer optimization phases and faster convergence.

More accurate result size and distinct value estimates invariably lead to a faster execution plan being chosen, which can greatly benefit frequently executed queries. If a query is executed frequently but with different parameter values, the same plan chosen for one set of parameter values can be used for all parameter values, provided that the data distributions in the database are relatively uniform.

The changes required to the query optimizer code to support sub-plan memoization are straightforward and localized. This makes it easy to incorporate sub-plan memoization into existing optimizers. It also makes sub-plan memoization a feature that can be turned on and off.

EXAMPLES

Query optimization by sub-plan memoization has been implemented with a modified version of Microsoft SQL Server 2000. The following examples use input queries from the TPC-R benchmark, an important decision support benchmark. TPC-R data is uniformly distributed. Since traditional estimation techniques work best for uniformly distributed data, using TPC-R gives these prior art techniques the best possible advantage when compared to sub-plan memoization.

Microsoft SQL Server 2000 uses sophisticated histogram based techniques for estimation. All relevant histograms were built, using full scans of the data rather than samples to provide the maximum possible accuracy. In spite of the best possible histograms being available and the data being uniformly distributed, the preciseness of sub-plan memoization allowed an optimizer constructed in accordance with the invention to choose better execution plans than using histograms. This is shown in the following two examples, in which queries were optimized using sub-plan memoization and using histograms to compare the two techniques.

Consider the following query which is referred to as Example 1:

```
select    c_custkey,
          c_name,
          sum(l_extendedprice * (1-l_discount)) as revenue,
          c_acctbal
          n_name,
          c_address,
          c_phone,
          c_comment
from      customer,
          orders,
          lineitem,
          nation
where     c_custkey = o_custkey
          and l_orderkey = o_orderkey
          and o_orderdate >= '1993-10-1'
          and o_orderdate < dateadd(mm, 3, '1993-10-1')
          and l_returnflag = 'R'
          and c_nationkey = n_nationkey
group     by c_custkey,
             c_name,
             c_acctbal,
             c_phone,
             n_name,
```

-continued

```
             c_address
             c_comment
order by revenue desc
```

Example 1 is an instance of query 10 of the TPC-R benchmark. For this query, query optimization by sub-plan memoization required two optimization phases. The second phase used the exact values of sub-plan result sizes and distinct values determined at the end of the first phase, but did not generate any new sub-plans (i.e., did not explore any new parts of the plan space). The join order and join methods chosen by the optimizer using sub-plan memoization are:

lineitem HASH JOIN (orders HASH JOIN (nation HASH JOIN customer))

Using histograms, the join order and methods are given by:

((nation LOOP JOIN customer) HASH JOIN orders) HASH JOIN lineitem

In these examples, a rich set of indexes is available for the optimizer to choose from. In this case there were indexes on each table that provided all the required attributes for that table. The optimizer chose to use the same indexes when using sub-plan memoization and when using histograms for all tables except the customer table. Using sub-plan memoization, the optimizer chose to use the clustered index to access the customer table (equivalent to a table scan), whereas using histograms, it chose to use a non-clustered index on the table. The execution time of the plan chosen using sub-plan memoization for example 1 was 62% of the execution time of the plan chosen using histograms.

The following query is referred to as Example 2:

```
select    n_name,
          sum(l_extendedprice*(1-l_discount)) as revenue
from      customer,
          orders,
          lineitem,
          supplier,
          nation,
          region
where     c_custkey = o_custkey
          and o_orderkey = l_orderkey
          and l_suppkey = s_suppkey
          and c_nationkey = s_nationkey
          and s_nationkey = n_nationkey
          and n_regionkey = r_regionkey
          and r_name = 'ASIA'
          and o_orderdate >= '1/1/1994'
          and o_orderdate < dateadd(yy, 1, '1/1/1994')
group by n_name
order by revenue desc
```

Example 2 is an instance of query 5 of the TPC-R benchmark. Using sub-plan memoization required three optimization phases for this query (i.e., the second phase did explore new parts of the plan space, but the third phase did not). Using sub-plan memoization, the join order and methods are given by:

region HASH JOIN (nation MERGE JOIN (supplier HASH JOIN ((customer HASH JOIN orders) HASH JOIN lineitem)))

A prior art optimizer using histograms chose a left deep plan in which the joins are given by:

nation LOOP JOIN (region LOOP JOIN (supplier LOOP JOIN (customer LOOP JOIN (orders LOOP JOIN lineitem))))

The optimizer chose the same indexes for all tables in both cases. The execution time of the plan chosen using sub-plan memoization was 17% of the execution time of the plan chosen using histograms, a very significant speedup.

Query optimization by sub-plan memoization allows the query optimizer to use exact values for the result sizes of sub-plans and the number of distinct values in their outputs instead of the approximate values obtained using, say, histograms. Query optimization by sub-plan memoization increases the cost of optimizing queries, but provides more efficient query execution plans. This makes it very suitable for embedded queries in high-performance applications.

Computer System

Figure 1:
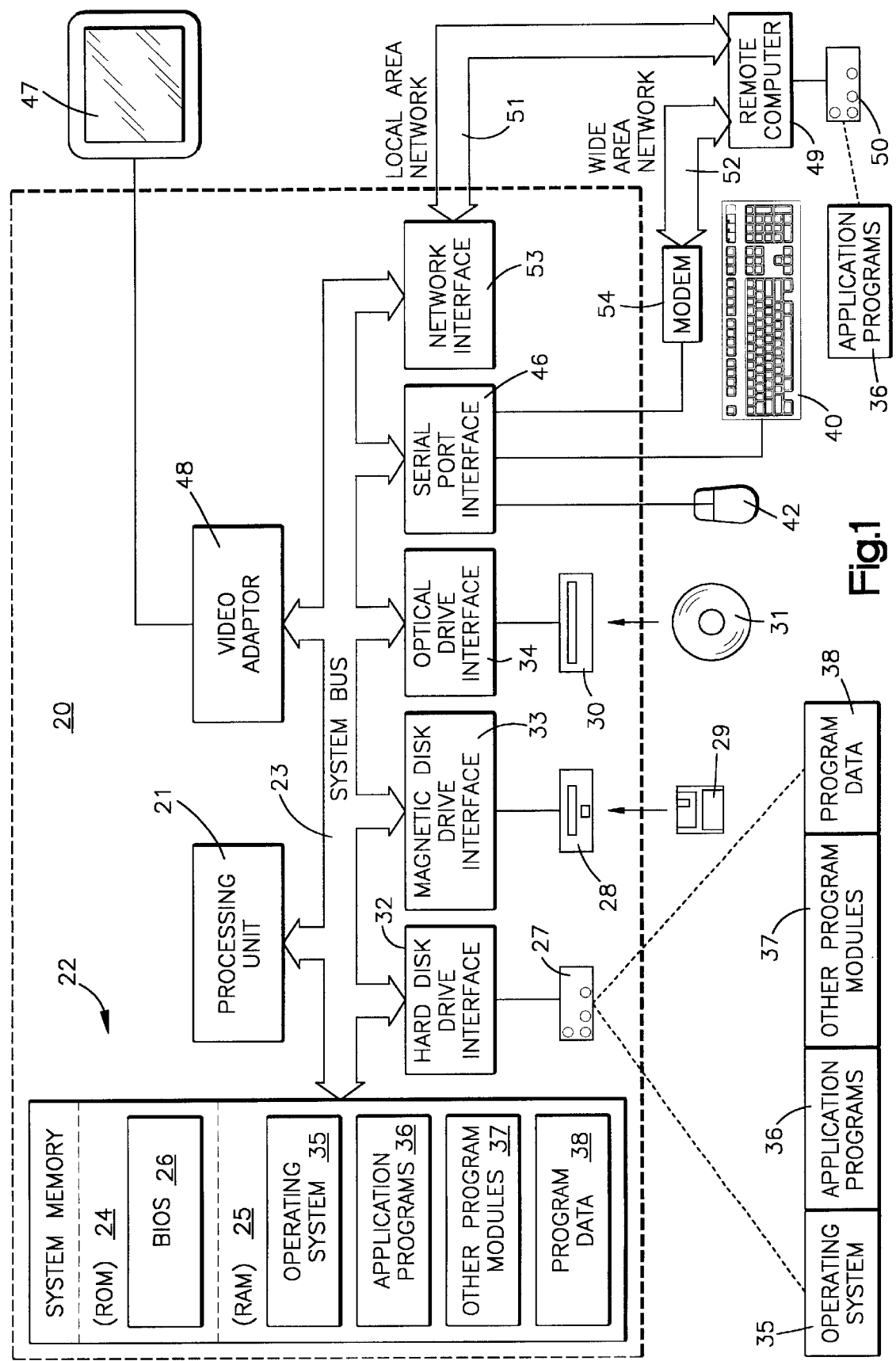
FIG. 1 is a representative computing device for use in practicing the present invention.

With reference to FIG. 1 an exemplary embodiment of the invention is practiced using a general purpose computing device 20. Such a computing device is used to implement both the client 12 and the server 16 depicted in FIG. 2. The device 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Although the present invention has been described with a degree of particularity, it is the intent that the invention include all modifications and alterations from the disclosed design falling within the spirit or scope of the appended claims.

What is claimed is:

1. An iterative process for optimizing a query to produce an optimized query execution plan for a database comprising the steps of:
    a) initializing a sub-plan memo data structure for storing data concerning multiple sub-plans that form parts of potential query execution plans;
    b) optimizing an input query to produce a first set of sub-plans, which when executed produce result record sets from the database;
    c) forming a sub-plan query statement for each of the sub-plans that make up the first set of query execution sub-plans;
    d) executing each of the sub-plan query statements on the database and storing a result of said execution in the sub-plan memo data structure for use in producing a final query execution plan for answering the input query; and
    e) creating a different set of query sub-plans using a result stored in the sub-plan memo data structure and using said query sub-plans to create one or more additional sub-plan query statements which are then executed over the database.

2. The process of claim 1 wherein executing a sub-plan query statement produces a count of the number of data records and a count of the number of distinct data record values as a result which are stored in the sub-plan memo data structure.

3. The process of claim 1 wherein additional sub-plans are added to said first set of sub-plans in a sequence of optimization iterations until no sub-plans are added that do not have corresponding sub-plan query statements that have been executed over the database.

4. The process of claim 3 wherein a decision to add a new sub-plan during said sequence of optimization iterations uses results stored in the sub-plan memo data structure to produce one or more additional query execution sub-plans.

5. The method of claim 1 wherein the first set of sub-plans is derived from data in a catalog containing statistics regarding the contents of the database.

6. The method of claim 5 wherein data from the catalog is used to produce a sub-plan execution solution for each of the sub-plans in said first set of sub-plans.

7. The method of claim 5 wherein an optimizer component does not execute sub-plan query statements nor store results in the sub-plan memo data structure for certain input queries but instead uses the contents of said catalog to create the final query execution plan.

8. Computer apparatus for executing a query comprising:
a) a computer input for receiving a user query;
b) a computer memory containing a sub-plan memo data structure for storing data concerning multiple sub-plans that form parts of potential query execution plans for answering the user query;
c) an optimizer component for evaluating an input query to produce a first set of sub-plans, which when executed produce result record sets from the database;
d) said optimizer component including means for forming a sub-plan query statement for each of the sub-plans that make up the first set of query execution sub-plans;
e) a query execution component for executing each of the sub-plan query statements on the database and storing a result of said execution in the sub-plan memo data structure for use in producing a final query execution plan for answering the input query; and
f) said optimizer component including means to create a different set of query sub-plans using the results stored in the sub-plan memo data structure.

9. The apparatus of claim 8 wherein said optimizer component executes a sub-plan query statement and produces a count of the number of data records and a count of the number of distinct data records as results which are stored in the sub-plan memo data structure.

10. The apparatus of claim 8 wherein the optimizer component adds additional sub-plans to said first set of sub-plans in a sequence of optimization iterations until no sub-plans are added that do not have corresponding sub-plan query statements that have been executed over the database.

11. The apparatus of claim 10 wherein the optimizer bases a decision to add a new sub-plan during said sequence of optimization iterations on using results stored in the sub-plan memo data structure to produce one or more additional query execution sub-plans.

12. The apparatus of claim 8 wherein the optimizer adds sub-plans to said first set of query execution sub-plans in a sequence of optimization iterations until the number of optimization iterations reaches a specified number or until no sub-plan query statements are added to the sub-plan memo data structure.

13. The apparatus of claim 8 wherein the optimizer maintains a catalog containing statistics regarding the contents of the database and derives the first set of sub-plans from data in said catalog.

14. The apparatus of claim wherein the optimizer uses data from the catalog to produce a sub-plan execution solution for at least some of the sub-plans in said first set of sub-plans.

15. A computer readable medium containing instructions for optimizing a query execution plan for a database comprising instructions for:
a) initializing a sub-plan memo data structure for storing data concerning multiple sub-plans that form parts of potential query execution plans;
b) evaluating an input query to produce a first set of sub-plans, which when executed produce result record sets from the database;
c) forming a sub-plan query statement for each of the sub-plans that make up the first set of query execution sub-plans;
d) executing each of the sub-plan query statements on the database and storing a result of said execution in the sub-plan memo data structure for use in producing a final query execution plan for answering the input query; and
e) creating a different set of query sub-plans using a result stored in the sub-plan memo data structure and using said query sub-plans to create one or more additional sub-plan query statements which are then executed over the database.

16. The computer readable medium of claim 15 wherein instructions for executing a sub-plan query statement produce a count of the number of data records and a count of the number of distinct data record values as results which are stored in the sub-plan memo data structure.

17. The computer readable medium of claim 15 wherein said instructions add sub-plans to said first set of sub-plans in a sequence of optimization iterations until no sub-plans are added that do not have corresponding sub-plan query statements that have been executed over the database.

18. The computer readable medium of claim 17 wherein the instructions implement a decision to add a new sub-plan during said sequence of optimization iterations based on results stored in the sub-plan memo data structure to produce one or more additional query execution sub-plans.

19. The computer readable medium of claim 15 wherein the instructions add sub-plans to said first set of query execution sub-plans in a sequence of optimization iterations until the number of optimization iterations reaches a specified number or until no sub-plan query statements are added to the sub-plan memo data structure.

20. The computer readable medium of claim 15 wherein the instructions construct the first set of sub-plans from data in a catalog containing statistics regarding the contents of the database.

21. The computer readable medium of claim 20 wherein the instructions use data from the catalog to produce a sub-plan execution solution for each of the sub-plans in said first set of sub-plans.

22. The computer readable medium of claim 21 wherein the instructions implement a decision which determines whether or not to execute sub-plan query statements and store results in the sub-plan memo data structure for certain input queries and when the sub-plan query statements are not executed said instructions use the contents of said catalog to create the final query execution plan.

23. An iterative process for optimizing a query to produce an optimized query execution plan for a database comprising the steps of:
a) initializing a sub-plan memo data structure for storing data concerning multiple sub-plans that form parts of potential query execution plans;
b) optimizing an input query to produce a first set of sub-plans, which when executed produce result record sets from the database;

c) forming a sub-plan query statement for each of the sub-plans that make up the first set of query execution sub-plans;

d) executing each of the sub-plan query statements on the database and storing a result of said execution in the sub-plan memo data structure for use in producing a final query execution plan for answering the input query; and e) performing a series of optimization iterations in which additional sub-plans are added to the first set of query execution sub-plans until the number of optimization iterations reaches a specified number or until no sub-plan query statements are added to the sub-plan memo data structure.

24. A computer readable medium having instructions for optimizing a query to produce an optimized query execution plan for a database comprising instructions for:

a) initializing a sub-plan memo data structure for storing data concerning multiple sub-plans that form parts of potential query execution plans;

b) optimizing an input query to produce a first set of sub-plans, which when executed produce result record sets from the database;

c) forming a sub-plan query statement for each of the sub-plans that make up the first set of query execution sub-plans;

d) executing each of the sub-plan query statements on the database and storing a result of said execution in the sub-plan memo data structure for use in producing a final query execution plan for answering the input query; and e) performing a series of optimization iterations in which additional sub-plans are added to the first set of query execution sub-plans until the number of optimization iterations reaches a specified number or until no sub-plan query statements are added to the sub-plan memo data structure.

25. A process for optimizing a query to produce a query execution plan for a database comprising the steps of:

a) initializing a sub-plan memo data structure for storing data concerning multiple sub-plans that form parts of potential query execution plans;

b) optimizing an input query to produce a first set of sub-plans, which when executed produce result record sets from the database;

c) forming a sub-plan query statement for each of the sub-plans that make up the first set of query execution sub-plans; and d) executing each of the sub-plan query statements on the database and storing a result of said execution in the sub-plan memo data structure including a hash table wherein the query for a given sub-plan is a key for accessing contents of said hash table relating to result size and number of distinct values from execution of the query for said sub-plan for use in producing a final query execution plan for answering the input query.

26. A computer readable medium having instructions for optimizing a query to produce a query execution plan for a database comprising instructions for:

a) initializing a sub-plan memo data structure for storing data concerning multiple sub-plans that form parts of potential query execution plans;

b) optimizing an input query to produce a first set of sub-plans, which when executed produce result record sets from the database;

c) forming a sub-plan query statement for each of the sub-plans that make up the first set of query execution sub-plans; and d) executing each of the sub-plan query statements on the database and storing a result of said execution in the sub-plan memo data structure including a hash table wherein the query for a given sub-plan is a key for accessing contents of said hash table relating to result size and number of distinct values from execution of the query for said sub-plan for use in producing a final query execution plan for answering the input query.

* * * * *